United States Patent [19]
Petro et al.

[11] 3,822,455
[45] July 9, 1974

[54] METHOD OF MANUFACTURING BEADED FILAMENT COILS FOR ELECTRIC LAMPS AND SIMILAR DEVICES

[75] Inventors: James Petro, Little Falls; Clair M. Rively, Old Bridge, both of N.J.

[73] Assignee: Westinghouse Electric Corporation, Pittsburgh, Pa.

[22] Filed: May 30, 1973

[21] Appl. No.: 365,369

Related U.S. Application Data

[60] Division of Ser. No. 163,651, July 19, 1971, which is a division of Ser. No. 792,988, Jan. 22, 1969, abandoned, Continuation of Ser. No. 317,880, Dec. 22, 1972, Pat. No. 3,778,664.

[52] U.S. Cl. ............................................. 29/25.18
[51] Int. Cl. ............................................. H01j 9/00
[58] Field of Search............ 29/25.11, 25.13, 25.14, 29/25.17, 25.18; 313/344

[56] References Cited
UNITED STATES PATENTS
3,729,787  5/1973  Rively et al...................... 29/25.18

Primary Examiner—Roy Lake
Assistant Examiner—James W. Davie
Attorney, Agent, or Firm—D. S. Buleza

[57] ABSTRACT

The tangling of helically-coiled wire articles during bulk handling and shipment is prevented by providing integral modules or beads of fused metal at each end of the articles which enclose the severed ends of the wire. In the case of tungsten wire coils that are designed for use in electric lamps and similar devices and are wound on iron mandrels, the fused beads are composed of tungsten-iron alloy and formed in situ during coil manufacture by melting the ends of the mandrel with a concentrated heat source such as a focused laser beam. The tungsten-iron alloy beads remain on the end turns of the coil during the subsequent mandrel-dissolving operation, are ductile and are formed without embrittling the tungsten wire. Various methods for manufacturing such beaded-end coils on a mass production basis using a laser are disclosed.

10 Claims, 13 Drawing Figures

PATENTED JUL 9 1974 3,822,455

METHOD OF MANUFACTURING BEADED FILAMENT COILS FOR ELECTRIC LAMPS AND SIMILAR DEVICES

CROSS-REFERENCES TO RELATED APPLICATIONS

This application is a division of application Ser. No. 163,651 filed July 19, 1971, which application is, in turn, a division of application Ser. No. 792,988 filed Jan. 22, 1969. The latter application has since been abandoned and replaced by continuation application Ser. No. 317,880 filed Dec. 22, 1972 now Pat. No. 3,778,664.

BACKGROUND OF THE INVENTION

1. Field of the Invention

The present invention relates to the manufacture of coiled articles, such as filament coils for electric lamps, and has particular reference to a method for manufacturing "tangle-free" wire coils.

2. Description of the Prior Art

As is well known, filamentary coils for fluorescent and incandescent lamps are manufactured by winding a tungsten wire around a mandrel of dissimilar metal, such as iron, mechanically cutting the resulting composite wire into segments of the desired length, and chemically dissolving the mandrel to provide the desired individual coils of tungsten wire. In the case of so-called "barrelless" electrode coils currently being used as cathodes in fluorescent lamps, the coil consists of a coiled tungsten core wire that is enclosed in a loose over-winding of fine tungsten wire which provides a "basket-like" structure for the electron-emission material. Since the tungsten core wire is of small diameter, a burr is formed when it is cut during the coil manufacturing operation. Consequently, the burred ends of the loose-fitting core wires protrude from the ends of the coil and are of such size that they snag and interlock with the turns of other coils when such coils are placed in a container or hopper and contact one another. In the extreme, the tangling becomes so complete that it is possible to lift the entire contents of a container that holds hundreds of coils simply by gripping and pulling one end of a single coil.

Because of this inherent tendency of such barrelless fluorescent lamp coils to tangle, it has been extremely difficult to design a satisfactory coil feeder which will automatically separate and supply the coils to a mounting machine. The prior art coils, accordingly, had to be manually separated and fed into the mounting machine. This is a time-consuming tedious operation and materially increases the manufacturing cost of the lamps. In addition, large quantities of finished coils sometimes had to be scrapped during inspection because it was impossible to untangle them. The percent shrinkage is thus very high and further increases the lamp manufacturing cost.

The present invention provides an economical and practical solution to the aforementioned tangling problem and reduces the manufacturing cost of electric lamps by providing an efficient method of manufacturing electrode coils which are so conformed that they can be readily separated and fed into the mount-making machine by an automatic coil-feeder.

SUMMARY OF THE INVENTION

The aforesaid objectives and other advantages are achieved in accordance with the present invention by providing an integral nodule or bead of fused ductile metal at each end of the coiled articles. In the case of a fluorescent lamp electrode coil of barrelless construction, the ends of the iron mandrel are melted in situ and form pools of molten iron which dissolve the overlying tungsten wire turns, thus producing integral beads of tungsten-iron wire alloy that are fused to and merge with the respective end turns of tungsten wire. The beads are formed in such a manner that the coil turns remain in their original unrecrystallized state. Since the beads contain tungsten, they are not dissolved by the acid used to dissolve and remove the iron mandrel so that the finished coils are terminated by ductile beads that close the respective end turns of the coil and merge with and enclose the severed ends of the tungsten core wire and over-winding of fine tungsten wire. The finished coils can thus be processed, inspected and shipped en masse without becoming tangled or fracturing. Shrinkage during manufacture and handling is drastically reduced and the coils readily separate for automatic feeding into the mount-making machine.

The beads of fused tungsten-iron alloy can be formed on the ends of precut coils that still contain their iron mandrels. However, the severing and beading of the coils are preferably achieved simultaneously by indexing a continuous mandrel-coil stock wire in front of a laser, energizing the laser in timed sequence with the wire-indexing speed so that the focused laser beam strikes the mandrel component of the stock wire at a point located a selected distance from the free end of the wire, and then applying an axial pull on the free end of the stock wire after the laser beam has melted the iron mandrel and formed a pool of molten tungsten-iron alloy. By properly adjusting the wire-indexing speed, the duration and intensity of the laser beam and the timing and speed with which the end segment is pulled away from the stock wire, non-recrystallized mandrel-containing embryonic coils of precisely controlled length with ductile beads formed at each end can be very rapidly produced. These embryonic coils are then immersed in an acid bath which dissolves the iron mandrels and provides finished tungsten electrode coils having beaded ends.

BRIEF DESCRIPTION OF THE DRAWINGS

A better understanding of the invention will be obtained by referring to the exemplary embodiment shown in the accompanying drawings, wherein.

DESCRIPTION OF THE PREFERRED EMBODIMENTS
(FIGS. 1-6)

Figure 1:
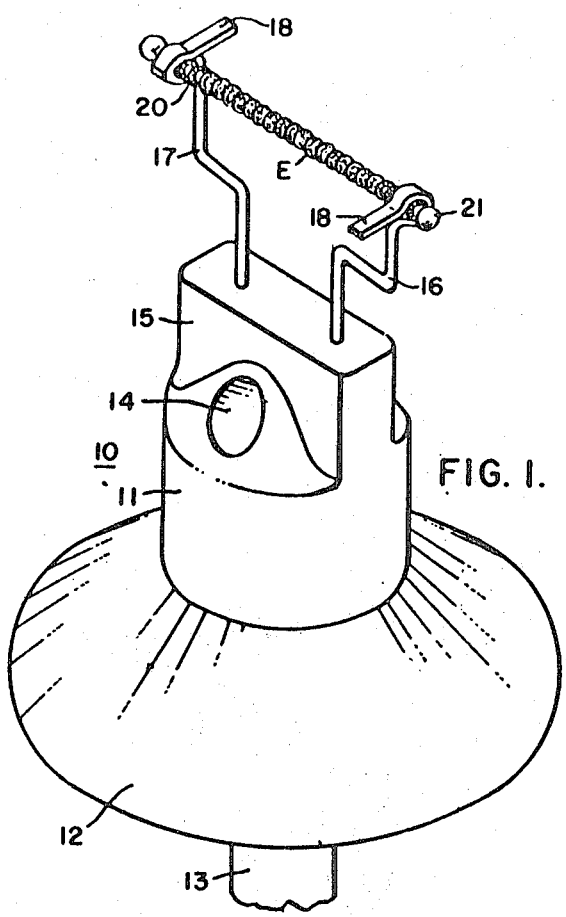
FIG. 1 is an enlarged perspective view of a mount assembly for a fluorescent lamp which incorporates a "beaded-end" type electrode.

In FIG. 1 there is shown a mount assembly 10 for a 40 watt T12 fluorescent lamp. The mount 10 consists of the usual glass stem 11 that has a flare 12 at one end and an axially depending glass exhaust tube 13 which extends into the stem tube and, together with an aperture 14 formed in the side wall of the tube, provides a passageway for evacuating and mercury-dosing the lamp after the stem 11 has been sealed into the lamp envelope. A pair of lead wires 16, 17 are hermetically sealed through a press 15 formed on the end of the stem 11 and the ends of the wires are formed into clamps 18. These clamps are closed around the ends of a thermionic cathode consisting of a barrelless electrode coil 20 of non-recrystallized tungsten wire that is coated with a suitable electron-emission material E, such as the well-known mixture of alkaline earth oxides.

As will be noted, each end of the coil 20 is provided with a nodule such as a generally spherical bead 21 of fused ductile metal that extends across the end face of the coil. It will also be noted that the coating E of emission material is confined to the medial portion of the coil 20 and that the coil turns immediately adjacent the clamps 18 are uncoated. Such coils are referred to in the art as "barrelless" coils because they consist of a plurality of spaced turns that are of the same diameter and thus form a helix that is of linear configuration and the same cross-sectional dimension throughout its length. Such barrelless coils, accordingly, do not have the enlarged secondary turns and medial coil barrel portion characteristic of coiled-coil or triple-coiled filaments.

Figure 2:
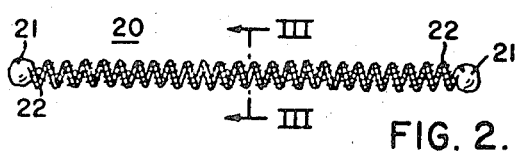
FIG. 2 is a front elevational view of the electrode coil before it is mounted on the lead wires and coated with emission material.

As shown in FIGS. 1 and 2, the beads 21 are integral with and terminate the end turns 22 of the coil 20 and are of approximately the same size as the outer diameter of the coil. The beads 21 accordingly merge with and close the ends of the coil 20.

Figure 3:
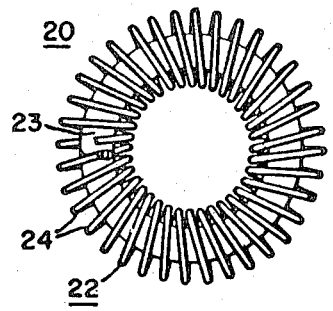
FIG. 3 is an enlarged cross-sectional view through the uncoated coil along the line III—III of FIG. 2.

As illustrated in the enlarged view of the coil 20 shown in FIG. 3, the coil consists of a coiled core wire 23 of suitable refractory material (non-recrystallized tungsten for example) which has a winding of fine refractory wire 24, such as non-recrystallized tungsten, loosely coiled therearound. The turns of the fine wire 24 enclose the core wire 23 and form a basket-like structure or matrix which increases the emission-holding capacity of the coil 20. When the medial portion of the coil 20 is coated with the emission material E after the coil is attached to the lead wires 16, 17, the emission material E fills the matrix formed by the loose overwinding of fine wire 24 and bridges the turns 22 of the coil 20, as is shown in FIG. 1.

Figure 4:
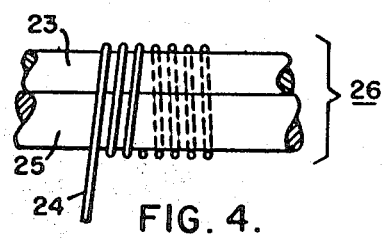
FIG. 4 is an enlarged elevational view of a segment of the composite wire used in making the coil shown in the preceding Figures.
Figure 5:
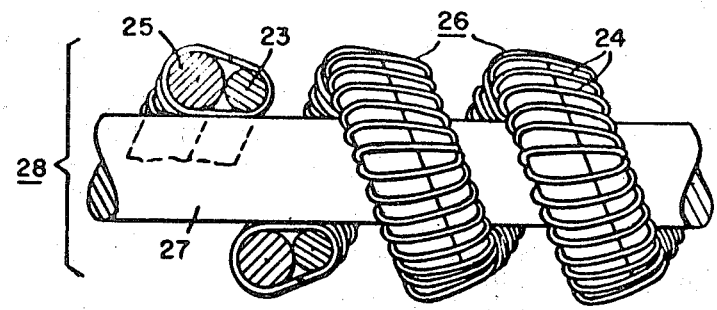
FIG. 5 is an enlarged perspective view of a portion of the aforementioned composite wire after it has been wound around the iron mandrel to form a continuous "stock" wire.

The electrode coil 20 is manufactured by pairing the tungsten core wire 23 with a slightly larger filler wire 25 of dissimilar metal, such as iron, that can be subsequently chemically dissolved from the wound coil without affecting the tungsten core wire. The paired tungsten core wire 23 and iron filler wire 25 constitute a dual-strand core component. The fine tungsten wire 24 is then tightly wound around the paired core wire 23 and filler wire 25 (that is, the aforesaid dual-strand core component) to form the composite wire 26 shown in FIG. 4. This composite wire 26 is, in turn, wound around an iron mandrel 27 at the required TPI to form a continuous coil-mandrel composite 28 shown in FIG. 5. For convenience, this composite 28 is referred to herein as the "stock"wire.

In the prior art, after the stock wire 28 was mechanically cut into segments of the desired lengths the resulting segments were placed in an acid bath (e.g., hydrochloric acid) which dissolved the iron filler wire 25 and iron mandrel 27 and thus produced a finished coil consisting of the coiled tungsten core wire 23 and loose overwinding of fine tungsten wire 24. Since the tungsten core wire 25 is of such small diameter, it is impossible as a practical matter to mechanically cut it cleanly. As a result, burrs were unavoidably left on the cut ends. Because the core wire 25 is only loosely enclosed by the fine wire winding 24, the burred ends of the core wire naturally protruded from the ends of the finished coils and created the aforementioned snagging and tangling problem when the coils were placed into a hopper and handled en masse.

In accordance with the present invention, this snagging and tangling problem is solved by melting the ends of the iron mandrel 27, before the latter is chemically removed, and thereby forming an integral nodule or bead 21 of fused ductile tungsten-iron alloy at each end of the segments of stock wire 28. Since the acid that is used to dissolve the iron mandrel 27 and filler wire 25 does not attack tungsten, these tungsten-iron alloy beads 21 remain in place on the end turns of the finished coil 20, as shown in FIGS. 1 and 2, after the iron components have been removed.

When the iron mandrel 27 is melted the resultant pool of molten iron dissolves the overlying tungsten components of the composite wire 26 so that the ends of the core wire 25 and overwound fine wire 24 merge with and are anchored in the respective beads 21. The end turns of the finished coil 20 are thus terminated by globular beads 21 that are substantially smooth and larger than the spacing between the coil turns 22, thereby completely eliminating the troublesome burred ends and interlocking problem characteristic of the prior art coils. The improved beaded-end coils 20 of the present invention, accordingly, can be processed and shipped in bulk without the coils snagging one another and becoming entangled. As a result, they can be readily separated and supplied to a mounting machine by a suitably designed automatic coil-feeder.

While various concentrated and controllable heat sources, such as focused electron beam, a plasma torch or a sharply defined oxy-hydrogen flame, can be used to melt the ends of the iron mandrel 27, a laser beam is preferred since it can be readily focused with great accuracy onto the ends of the iron mandrel.

Figure 6:
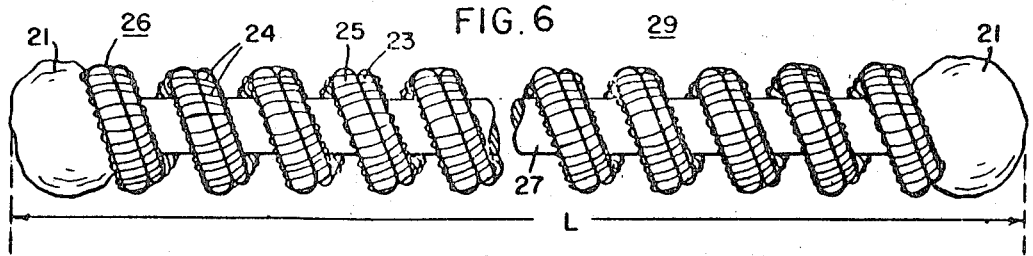
FIG. 6 is an enlarged elevational view of a severed segment of stock wire after the beads have been formed at each end and before the iron mandrel and iron filler wire have been dissolved.

A segment 29 of non-recrystallized stock wire 28 that has enlarged integral beads 21 of ductile tungsten-iron alloy formed on each end by means of a laser beam in accordance with the present invention is shown in FIG. 6. As will be noted, the beads 21 merge and are integral with the ends of the composite wire 26 that is wound about the iron mandrel 27. Such segments 29 are of precisely controlled length L and are, in effect, embryonic coils in that they need only be immersed in an acid bath, washed and dried to be transformed into finished coils.

CONCURRENT BEADING AND SEVERING (FIGS. 7–8)

An important feature of the invention resides in the concept that the beading and severing of the stock wire 28 into segments 29 can be achieved simultaneously by a single operation. The various stages of such a concurrent beading severing operation are illustrated in FIGS. 7a to 7b and will now be described.

Figure 7A:
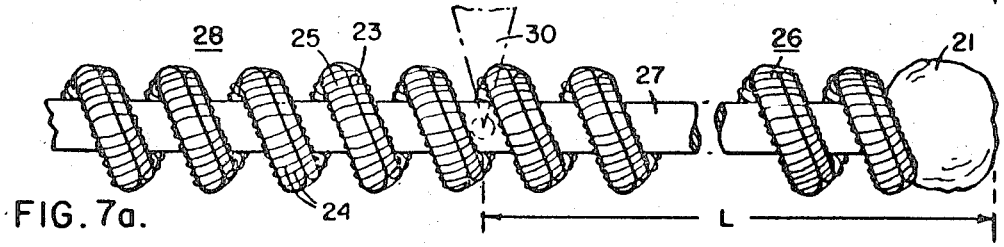
FIGS. 7a to 7d are elevational views of a section of stock wire illustrating the various steps in concurrently beading and severing an embryonic coil segment from the end of a continuous supply of stock wire in accordance with the invention.
Figure 7B:
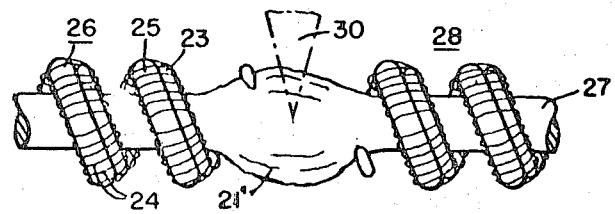
Figure 7C:
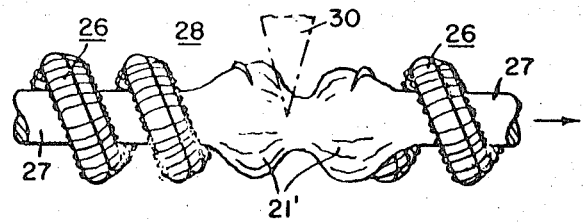
Figure 7D:
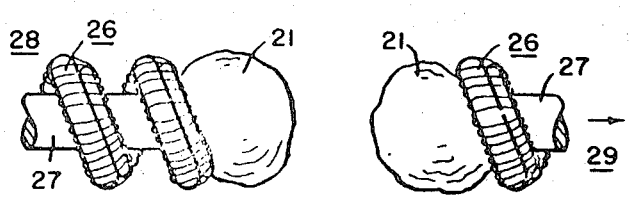

As shown in FIG. 7a, the stock wire 28 is subjected to a laser beam 30 which is focused onto the axis of the iron mandrel 27 at a point located the desired distance L from the end of the bead 21 formed on the free end of the stock wire by the previous beading severing operation. The intense heat generated by the impinging laser beam 30 rapidly melts the iron mandrel 27 and forms a pool of boiling iron which melts the overlying portion of the iron filler wire and the corresponding portions of the tungsten core and fine wires 23, 24 that constitute the composite wire 26. A molten pool 21' of tungsten-iron alloy is thus formed by the impinging laser beam 30, as shown in FIG. 7b. When this occurs an axial pull, indicated by the arrow in FIG. 7c, is applied to the free end of the stock wire 28 which causes the molten pool 21' to begin to subdivide into two globular masses. The axial pull or force is maintained until the molten pool of tungsten iron alloy completely separates. The laser is then turned off and, due to the surface tension of the molten alloy remaining on the severed ends of the stock wire 28, the respective globular masses of molten alloy inherently take the shape of generally spherical beads 21 which are integral and merge with the severed ends of the composite wire 26, as shown in FIG. 7d.

The molten globules of alloy rapidly solidify, thus providing fused tungsten-iron beads 21 on the end of the free end of the stock wire 28 and on the proximate end of the newly-formed segment 29 which has just been severed. The beaded segment 29 (depicted at the right in FIG. 7d) is accordingly identical with the segment 29 shown in FIG. 6 and is of predetermined length L.

Figure 8:
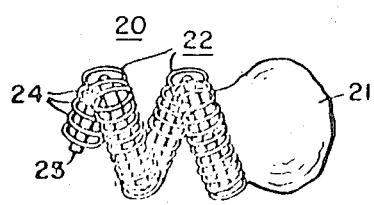
FIG. 8 is a similar view of one end of the finished non-recrystallized tungsten wire electrode coil after the iron mandrel and filler wire have been removed from the severed segment of stock wire.

As illustrated in FIG. 8, the beads 21 merge and are fused with the ends of the tungsten core wire 23 and overwinding of fine tungsten wire 24 in the finished coil 20. The beads 21 thus firmly anchor the tungsten wires in place and provide a smooth rounded closure at each end of the finished coil 20 which is too large to fit between the turns 22 of other such coils and thus inherently prevents coil tangling.

After the severed-beaded segment 29 is withdrawn and deposited in a hopper, the stock wire 28 is advanced a distance L relative to the laser and the operation just described is repeated. If the laser beam intensity and the length of time the laser is energized are properly correlated with the rate at which the stock wire 28 is indexed and the application and strength of the axial pull on the end of the stock wire, the operation can be repeated at a rapid rate to mass produce segments 29 of stock wire that are very uniform in length and beaded at each end.

It should be noted that the laser beam 30 does not actually cut the stock wire 28 in the strict sense of the term but merely melts the iron mandrel 27 and forms a pool of boiling iron which then dissolves the overlying portions of the composite wire 26 to form a bulbous mass of molten tungsten-wire alloy. The severing of the stock wire 28 is thus actually accomplished by the axial pull exerted on the free end of the stock wire after the molten mass has been formed. This is an important feature of the invention since the temperature of the iron mandrel 27 adjacent the molten pool of tungsten-iron alloy is too low to effect recrystallization of the tungsten in the time it takes to achieve the melting and severing operations. If this were not the case, then the unmelted portions of the tungsten wires 23, 24 would be recrystallized and become brittle with the result that the beaded end turns would fracture and separate from the finished coil 20 unless the latter were very carefully handled.

An apparatus which automatically beads and severs the stock wire 28 in the aforesaid manner is disclosed and claimed in application Ser. No. 365,368, filed May 30, 1973.

Preliminary test data indicates that the temperature of the iron mandrel 27 adjacent the molten pool 21' of tungsten-iron alloy is approximately 1,400°C whereas the recrystallization temperature of tungsten is about 1,900°C. Iron has a melting point of approximately 1,535°C. Thus, both the beads 21 and the tungsten wires comprising the turns 22 of the finished coil 20 are ductile and in an unrecrystallized state.

Another important feature of the invention in this regard is the fact that as the molten pool 21' of tungsten iron alloy forms it grows in size (as shown in FIG. 7b) with the result that it is no longer in focused relationship with the laser beam 30. Thus, heating of the bulbous molten pool is automatically retarded and overheating of the alloy and possible vaporization and crystallization thereof by the laser beam is avoided. In addition, since the composite wire 26 is of basket-like structure, it tends to hold the molten alloy so that approximately equal amounts of the alloy are retained on the severed ends of the stock wire when separation occurs.

It should also be pointed out that due to the intense heat generated by the impinging laser beam 30, melting and division of the molten alloy pool 21' are achieved almost instantaneously. Hence, the surface tension forces which are produced and the speed with which melting and separation occur prevents the molten metal from falling off the stock wire 28. It has also been found that the time required to melt the iron mandrel 27 and form the molten tungsten-iron pool 21' can be markedly decreased by directing a fine jet of oxygen onto the stock wire 28 at the site of laser beam impingement. The resulting oxidizing atmosphere at the site of melting produces controlled combustion which increases the amount of heat generated during the laser melting phase of the operation. Accordingly, the preferred method of simultaneously beading and severing includes the use of a controlled jet of oxygen at the melting site.

Analysis of fused tungsten-iron beads formed on the ends of barrelless tungsten electrode coils 20 of the type described shows that the beads consisted of 75 percent Fe, 20 percent W and approximately 5 percent $Fe_2W$ (weight percent). On the basis of a published 38 percent Fe-W phase diagram by Hansen, it is theorized that approximately only 4.5 percent (by weight) of the tungsten was in solid solution with the iron and thus constituted a true tungsten-iron alloy. The remainder of the tungsten and iron was not alloyed and comprised admixed metal in the form of a two-phase Fe-W casting or body. The term "tungsten iron alloy" as used herein and in the claims accordingly covers an admixture of Fe and W that is fused but which may or may not contain a true solid solution or alloy of Fe-W.

Specific Example - Barrelless Coil

As a specific example of the various values and parameters for those who wish to practice the invention, the barrelless 40 watt fluorescent electrode coil 20 of the type illustrated and described above has an overall length of approximately 11/16 inch (17 mm.). The diameter of the iron mandrel 27 is approximately 0.016 inch, diameter of the iron filler wire 25 is approximately 0.005 inch, the diameter of the tungsten core wire 23 is approximately 0.0023 inch, the diameter of the overwound tungsten wire 24 is approximately 0.001 inch, and the diameter of the finished coil was approximately 0.03 inch. A 100 watt $CO_2$ laser was employed and its beam was focused into a spot on the iron mandrel that was approximately 0.005 inch in diameter. The wavelength of the radiation produced by the laser was 10.6 microns. The power density of the focused laser beam which impinged upon the iron mandrel was approximately 4 million watts per sq. inch. The laser was energized for approximately 0.07 second and a pull of approximately 5 ounces was applied to the free end of the stock wire 28 to sever the molten pool of tungsten-iron alloy. The entire beading and severing operation was completed within the time that the laser was energized, that is, within 0.07 second.

Removal of the iron mandrel 27 and iron filler wire 25 from the beaded segments 29 of stock wire 28 was accomplished by immersing the segments in concentrated hydrochloric acid for approximately 30 minutes and the resulting coils were then washed in deionized water and in alcohol and dried.

Figure 9:
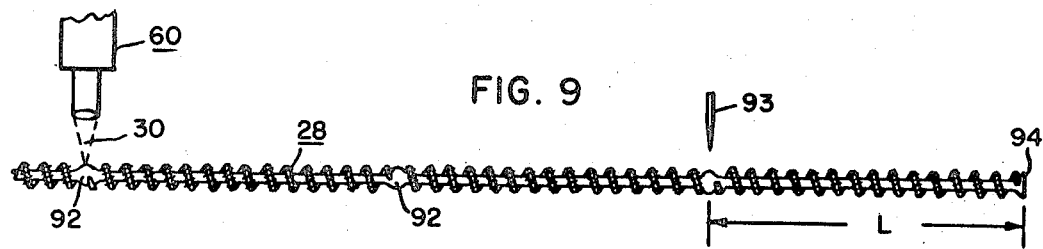
FIG. 9 is an elevational view showing an alternative method of separately beading and severing stock wire into embryonic coil segments using a laser and a cutting knife.

Alternative Embodiment (FIG. 9)

In FIG. 9 there is shown an alternative method for severing a continuous length of stock wire 28 into a plurality of segments of predetermined length L by means of a laser-beading operation and a subsequent separate cutting operation. As shown, the stock wire 28 is indexed in a predetermined manner past a laser 60 which is energized in timed sequence with the index speed so that the stock wire 28 is melted at a plurality of uniformity spaced points to provide a series of fused tungsten-iron alloy nodules or beads 92. These beads 92 are subsequently mechanically severed by a knife 93 to provide individual segments of predetermined length L. In contrast to the segments previously described, the segments formed in accordance with this embodiment are terminated at each end by a bisected globular bead 94 that have substantially flat end faces. In the finished coil, these bisected beads 94 extend transversely of the coil axis and are integral with and terminate the respective end turns of the coil.

Figure 10:
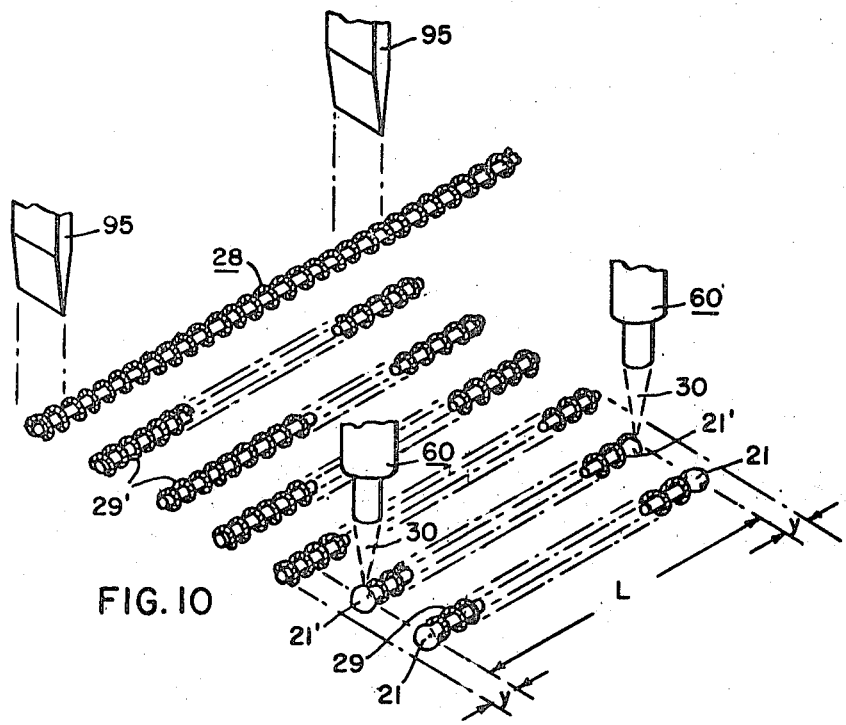
FIG. 10 is a perspective view illustrating another method wherein beads are simultaneously formed on both ends of precut segments of stock wire.

Alternative Embodiment (FIG. 10)

In FIG. 10 there is shown another method of providing fused metallic beads on the ends of a refractory wire coil in accordance with the present invention. In this embodiment the sequence of operations is reversed from that shown in the FIG. 9 embodiment. As illustrated, the stock wire 28 is first cut into individual segments 29' by a pair of cutting knives 95 that are so spaced that the segments are initially longer than the desired finished length L and sections of a lengthy protrude from each end of the cut segments. The protruding sections are of such length that, when melted, they will form tungsten-iron beads of the desired size. In the case of the 40 watt barrelless electrode coils described above, the protruding sections are each approximately ½ mm. in length.

The precut segments 29' of wire stock 28 are aligned with one another and indexed, as by a suitable conveyor, past a pair of lasers 60 that are so spaced and energized that their beams 30 strike and melt the protruding sections of the respective segments 29' as they are indexed into aligned position with the lasers. The resulting pools 21' of molten alloy inherently form globular beads 21 of such size that the finished segments 29 are of the desired length L. As will be obvious, the foregoing sequence of operations can be automated by providing suitable means for actuating the knives 95 in timed sequence with the index of the conveyor and the operation of the lasers 60.

While several methods for manufacturing beaded coils have been illustrated and described, it will be appreciated that various modifications in the foregoing can be made without departing from the spirit and scope of the invention. For example, the invention is not limited to tungsten coils that are wound on iron mandrels. Any combination of dissimilar metals which, when melted, coact to form ductile beads that are composed of a mixture of the fused metals and do not embrittle the wire coil can be employed. Thus, mandrels or inserts of a metal (such as nickel, copper, aluminum, cobalt or titanium) which has a melting point of the same order of magnitude as iron can be used with a tungsten or similar refractory wire coil.

The invention can also be employed to inhibit tangling of coiled articles which are wound from heavier wire than that used in the filamentary electrode coil 20 disclosed herein and the nodules can be formed on the very ends of the wire. The nodules in this case may be only slightly larger than the wire diameter — the important thing being that the ends of the wire are provided with smooth surfaces which will not snag the turns of other coils and cause the coils to become entangled when placed in a container, or when being processed or handled en masse. If the coiled member has a leg section at each end, such leg section can comprise an uncoiled length of wire which is terminated by a nodule that is of the same size or only slightly larger than the wire diameter. The terms "nodule" or "bead" as used herein and in the claims accordingly include within their scope a quantity of fused material which provides a generally smooth non-snagging surface at the end of a member, such as a metal wire, which has been wound into a coil.

We claim as our invention:

1. In the manufacture of a filamentary coil that is adapted for use in an electric lamp or the like, the method of providing means at each end of the finished coils which inhibits the tendency of such coils to interlock with each other and become entangled when placed in a container or handled en masse, which method comprises;

winding a wire of refractory metal on a mandrel of dissimilar metal that has a lower melting point than said refractory metal and, when molten, dissolves and at least partially alloys with said refractory metal, melting the ends of said mandrel in situ to form molten nodules of molten metal that contain an alloy of the metals which comprise said mandrel and wire and are integral with and located at the respective ends of the wire winding, cooling said nodules of molten metal until they solidify, and then chemically removing the unmelted portion of said mandrel so that the ends of the resulting hollow wire coil are terminated by said nodules of fused metal.

2. The method of claim 1 wherein the in situ melting of said mandrel is achieved by focusing a laser beam onto the ends of said mandrel.

3. The method of claim 1 wherein;

said refractory metal wire is composed of tungsten and said mandrel is composed of iron, and the unmelted portion of said mandrel is chemically removed by immersing the mandrel-coil component in hydrochloric acid.

4. The method of claim 1 wherein;

said refractory metal wire is wound around a mandrel of said dissimilar metal that is continuous and a continuous stock wire consisting of a mandrel-coil composite is accordingly formed, said continuous stock wire is mechanically cut into segments, and the ends of the mandrel in each of said stock wire segments is melted to form the said nodules of molten metal.

5. The method of claim 4 wherein;

the continuous stock wire is mechanically cut by a knife into segments of substantially the same length, and said segments are aligned in side-by-side relationship and the ends of each segment are melted concurrently.

6. The method of claim 5 wherein said concurrent melting is effected by a pair of laser beams.

7. In the manufacture of a coil of refractory metal wire that is formed by winding said wire around a continuous mandrel of dissimilar metal that is chemically removed after the mandrel-coil composite has been severed into segments of predetermined length, the method of severing the mandrel-coil composite into segments and providing the ends of the finished coils with a smooth non-tangling terminus, which method comprises;

melting predetermined portions of the mandrel component of said mandrel-coil composite to form spaced pools of molten metal which dissolve and fuse with the overlying turns of said refractory metal wire and form nodules of admixed metal that are located at the points at which the mandrel-coil composite is to be severed separating said mandrel-coil composite at said nodules in a manner such that some of the molten admixed metal remains on the separated ends of said composite and form beads thereat, and then chemically dissolving the mandrels from the resulting segments of the mandrel-coil composite without removing the beads of fused admixed metal so that each end of the resulting finished refractory wire coils are terminated by a fused bead of said admixed metal.

8. The method of claim 7 wherein the said predetermined portions of the mandrel component are melted with a laser beam and the separation of said mandrel-coil composite into said segments is effected while the nodules of admixed metal are still in a molten conditon so that the severing of said composite into segments and the beading of such segments are achieved concurrently.

9. The method of claim 7 wherein the separation of said mandrel-coil composite into said segments is effected by allowing the nodules of fused admixed metal to solidify and then mechanically cutting said nodules prior to the mandrel-dissolving operation.

10. The method of claim 8 wherein the melting of the said portions of the mandrel component by the laser beam is effected in a localized atmosphere of oxygen.

* * * * *